(12) United States Patent
Han et al.

(10) Patent No.: US 10,650,277 B2
(45) Date of Patent: May 12, 2020

(54) APPARATUS AND METHOD FOR TRAINING A LEARNING SYSTEM TO DETECT EVENT

(71) Applicants: CENTER FOR INTEGRATED SMART SENSORS FOUNDATION, Yuseong-gu, Daejeon (KR); KOREA ADVANCED INSTITUTE OF SCIENCE AND TECHNOLOGY (KAIST), Yuseong-gu, Daejeon (KR)

(72) Inventors: Dong Su Han, Daejeon (KR); Jin Woo Shin, Daejeon (KR); Byeok San Lee, Daejeon (KR); Jin Young Yang, Seoul (KR)

(73) Assignees: CENTER FOR INTEGRATED SMART SENSORS FOUNDATION, Yuseong-Gu, Daejeon (KR); KOREA ADVANCED INSTITUTE OF SCIENCE AND TECHNOLOGY (KAIST), Yuseong-Gu, Daejeon (KR)

( * ) Notice: Subject to any disclaimer, the term of this patent is extended or adjusted under 35 U.S.C. 154(b) by 344 days.

(21) Appl. No.: 15/789,361

(22) Filed: Oct. 20, 2017

(65) Prior Publication Data
US 2018/0114095 A1    Apr. 26, 2018

(30) Foreign Application Priority Data

Oct. 21, 2016    (KR) .................. 10-2016-0137950

(51) Int. Cl.
*G06K 9/62*    (2006.01)
*G06F 16/58*    (2019.01)

(52) U.S. Cl.
CPC ....... *G06K 9/6254* (2013.01); *G06F 16/5866* (2019.01); *G06K 9/6257* (2013.01); *G06K 9/6262* (2013.01); *G06K 2209/27* (2013.01)

(58) Field of Classification Search
None
See application file for complete search history.

(56) References Cited

U.S. PATENT DOCUMENTS 8,391,618 B1 * 3/2013 Chuang .............. G06K 9/00664
382/224
2003/0167264 A1 * 9/2003 Ogura ..................... G06F 16/58
(Continued)

FOREIGN PATENT DOCUMENTS

KR    10-0422798 B1    3/2004

OTHER PUBLICATIONS

Bruck et al., "Bi-gram based Query Expansion Technique for Amharic Information Retrieval System", I.J. Information Engineering and Electronic Business, vol. 6, 2015, pp. 1-7.

*Primary Examiner* — Fayyaz Alam
(74) *Attorney, Agent, or Firm* — Womble Bond Dickinson (US) LLP

(57) ABSTRACT

The present disclosure relates to apparatus and method for training a learning system to detect event. The present disclosure provides apparatus and method for training a learning system that includes an event related keyword collecting unit that collects an event related keyword inputted by a user, a related keyword collecting unit that collects at least one related keyword from a word database by transmitting an event related keyword to the word database, an event related image collecting unit that collects at least one event related image that is related to a search formula from an image database by transmitting the search formula to the image database, and a training unit that trains a learning system by communicating with the learning system with a use of an event related image as training data. In consequence, it is capable of setting a specific event to be detected by an apparatus for training a learning system by a user after a system is installed, and it is possible to train a (Continued)

learning system sustainably and sufficiently regarding a specific event and achieve a high accuracy of training the learning system.

13 Claims, 9 Drawing Sheets

(56) References Cited

U.S. PATENT DOCUMENTS

| | | | |
|---|---|---|---|
| 2004/0267740 A1* | 12/2004 | Liu | G06F 16/58 |
| 2008/0292196 A1* | 11/2008 | Jain | G06K 9/00664 |
| | | | 382/225 |
| 2009/0154795 A1 | 6/2009 | Tan et al. | |
| 2009/0299999 A1* | 12/2009 | Loui | G06K 9/00664 |
| 2010/0257202 A1* | 10/2010 | Szummer | G06K 9/6257 |
| | | | 707/771 |
| 2011/0085739 A1* | 4/2011 | Zhang | G06F 16/58 |
| | | | 382/218 |
| 2013/0170738 A1* | 7/2013 | Capuozzo | G06K 9/00677 |
| | | | 382/159 |
| 2015/0331929 A1* | 11/2015 | El-Saban | G06F 16/50 |
| | | | 707/739 |
| 2016/0078083 A1* | 3/2016 | Han | G06F 16/90328 |
| | | | 704/275 |
| 2017/0004383 A1* | 1/2017 | Lin | G06F 16/5866 |

\* cited by examiner

APPARATUS AND METHOD FOR TRAINING A LEARNING SYSTEM TO DETECT EVENT

CROSS-REFERENCE TO PRIOR APPLICATIONS

This application claims the benefit under 35 U.S.C. 119(a) of Korean Patent Application No. 10-2016-0137950 filed on Oct. 21, 2016 in the Korean Intellectual Property Office, the entire disclosure of which is incorporated herein by reference for all purposes.

BACKGROUND

1. Field of the Disclosure

The present disclosure relates to apparatus and method for training a learning system to detect event. For example, the present disclosure relates to apparatus and method for training a learning system to detect event that, by using a keyword that is selected by a user and is related to a specific event, collects an image and trains a learning system by using the collected image by a series of method. Besides, the present disclosure relates to apparatus and method for training a learning system to detect event that retrains the trained learning system in the level of images by using an image selected by a user.

2. Background of the Disclosure

Many events occur in real lives, and some of them are events that require understanding the content of the events and informing a specific person concerned therein. CCTV, car black box, etc. are used as a system collecting dynamic information within specific section, which is before a step of understanding the content of event.

In detail, a device with a camera module, such as CCTV or car black box, is widely used. In the case of CCTV, it is used for surveilling a crime or an accident in a crime-ridden district, such as a bank or alley, which needs security or is used for surveilling a housebreaking or fire. In the case of car black box, it is usually installed inside a car to record scenes before and after a crash and records data in real time for the purpose of providing information necessary for understanding what happened in a crash, for example, operations of an accelerator, brake, etc. and an engine's condition, speed, front-view of road, etc.

There is a technique that simply detects and shoots an occurrence of dynamic situation and informs a specific person thereof in the case that an event occurs in a photographing image (Korean Patent Registration Publication 10-0422798). However, in this case, there are some limits: for example, it is not capable of accurately specifying the details of the event that occurred in the video; a system cannot be trained by itself to improve the reliability on event detection; and it is difficult to set a system for detection of a new event after the system is installed.

SUMMARY OF THE DISCLOSURE

This Summary is provided to introduce apparatus and method for training a learning system to detect event that collects, by using a keyword that is related to a specific event selected by a user, an image related to the event in a series of method and trains a learning system by using the collected image. In addition, this Summary is provided to introduce apparatus and method for training a learning system to detect event that retrains the trained learning system based on images by using an image selected by a user.

According to an example of the present disclosure, apparatus for training a learning system that includes an event related keyword collecting unit that collects an event related keyword inputted by a user, a related keyword collecting unit that collects at least one related keyword from a word database by transmitting an event related keyword to the word database, an event related image collecting unit that collects at least one event related image that is related to a search formula from an image database by transmitting the search formula to the image database, and a training unit that trains a learning system by communicating with the learning system with a use of an event related image as training data.

In addition, according to another example of the present disclosure, method for training a learning system may include: collecting, by an event related keyword collecting unit, an event related keyword inputted by a user; collecting, by transmitting the event related keyword to a word database, at least one related keyword from a word database by a related keyword collecting unit, generating, by a search formula generating unit, at least one search formula regarding the event related keyword and related keyword; collecting, by transmitting the search formula to an image database, at least one event related image that is related to the search formula from the image database by an event related image collecting unit; and training a learning system by communicating with the learning system with a use of the event related image as training data.

The method for training a learning system may further include a sixth operation of collecting, by a test image collecting unit, at least one test image inputted by a user; a seventh operation of testing, by a learning system testing unit, the trained learning system based on the test image; a eighth operation of collecting, by a false image collecting unit, at least one false positive image and at least one false negative image from the learning system; a ninth operation of transmitting, by a related false image collecting unit, the false positive image and false negative image to the image database and collecting at least one false positive image that is related to the false positive image and at least one false negative image that is related to the false negative image from the image database; a tenth operation of labeling, by an labeling unit, the false positive related image as an event occurrence image and labeling the false negative related image as an event nonoccurrence image; and an eleventh operation of retraining, by a first retraining unit, a learning system by communicating with the a learning system with a use of the event occurrence image and event nonoccurrence image as retraining data.

The method for training a learning system may further include: a twelfth operation of collecting, by a reliability measurement image collecting unit, at least one reliability measurement image inputted by a user; a thirteenth operation of measuring, by a reliability measuring unit, a reliability value of the retrained learning system based on the reliability measurement image; a fourteenth operation of collecting, by a reliability result collecting unit, a reliability measuring image from the learning system if the reliability value is less than a threshold value; a fifteenth operation of transmitting, by a reliability measurement related image collecting unit, the reliability measurement image to the image database and collecting at least one reliability measurement related image that is related to the reliability measurement image from the image database; and a sixteenth operation of retraining, by a third retraining unit, a learning system by communicating with the learning system with a use of the reliability measurement related image as retraining data.

The method for training a learning system may repeat the sixth to eleventh operations and the twelfth to sixteenth operations at least twice.

The apparatus and method for training a learning system to detect event according to an example of the present disclosure is capable of accurately specifying and providing the details of an event occurred in a video to a specific person.

In addition, according to the present disclosure, a learning system is trained based on a learning algorithm, so it is capable of training a learning system sustainably and sufficiently to improve the reliability on the detection of event.

In addition, according to the present disclosure, it is capable of setting for detecting a new event by a user after a system is installed.

DETAILED DESCRIPTION OF THE DISCLOSURE

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terms such as "the first," "the second," etc. may be used to explain various elements, but the elements should not be limited by the terms. The terms are used only for distinguishing one element from other elements.

Words used in the present disclosure are merely used to explain specific examples, and not to limit the present disclosure. A singular expression includes a plural expression unless it is clearly expressed to be distinguished in contents.

In the present disclosure, in can be understood that the words, such as "include" or "have," are merely for indicating that there is a feature, number, step, operation, element, component, or a combination thereof described in this specification and that the existence of one or more than one another feature, number, step, operation, element, component, or a combination thereof, or additional probability will not be excluded in advance.

Examples of the present disclosure are described with reference to the accompanying drawings in detail.

Figure 1:
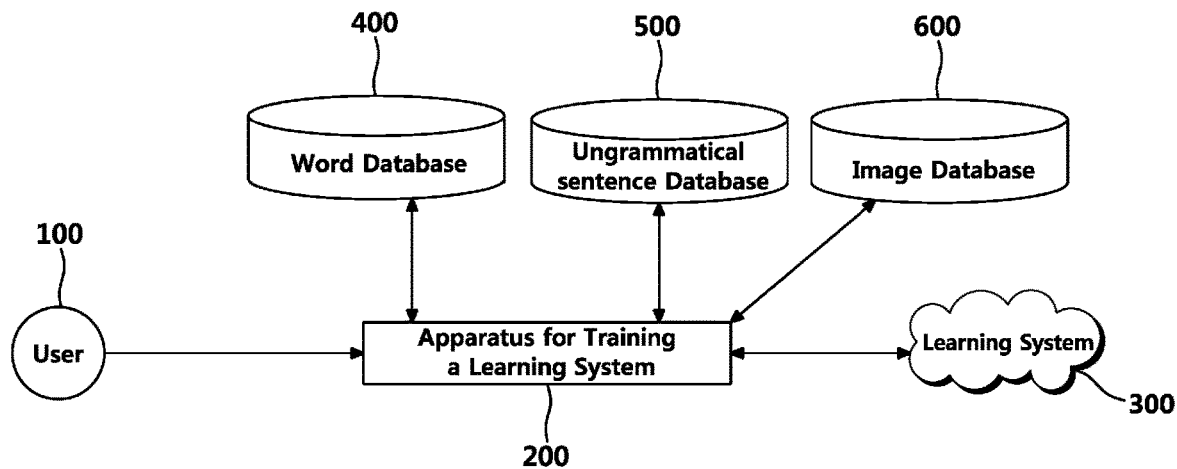
FIG. 1 is a diagram illustrating connections between an apparatus for training a learning system and peripheral elements according to an example of the present disclosure.
Figure 2:
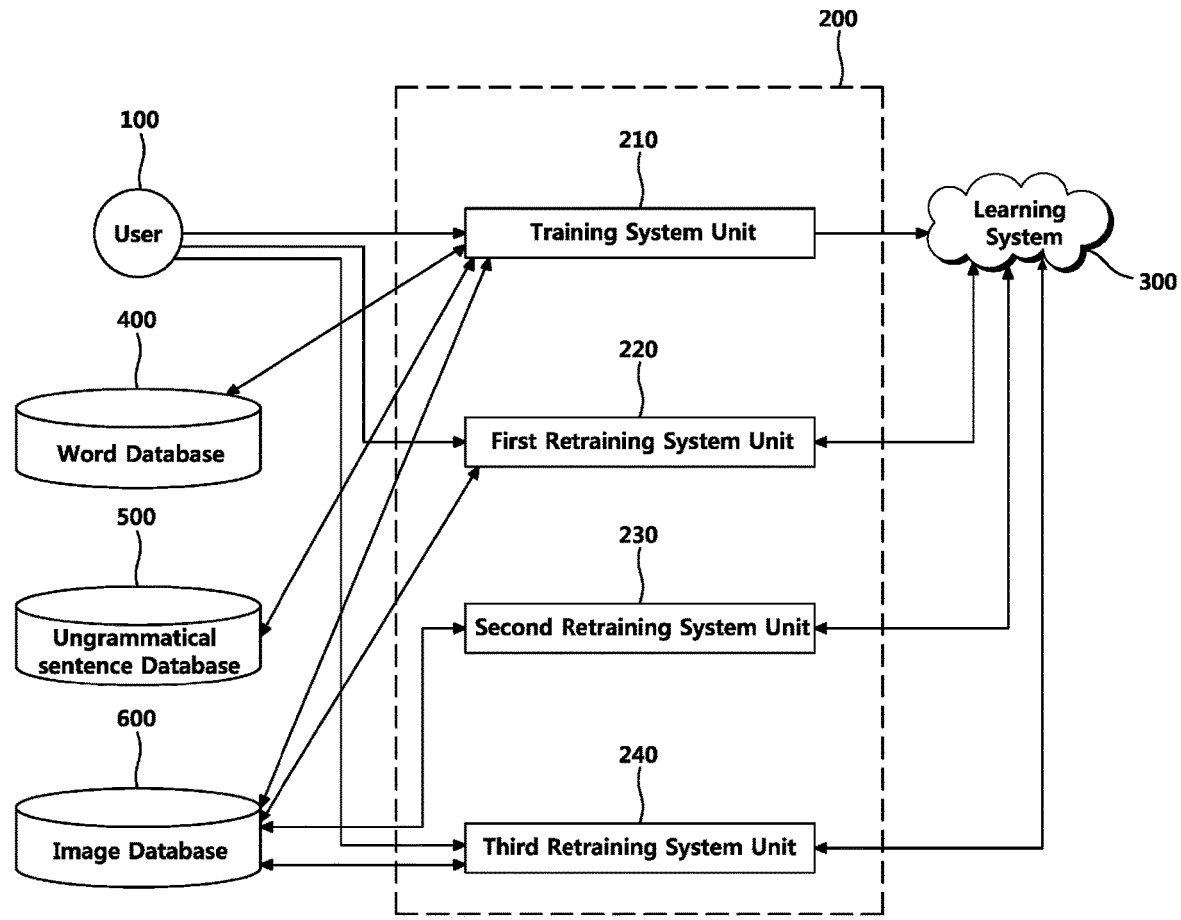
FIG. 2 is an explanation diagram illustrating an apparatus for training a learning system according to an example of the present disclosure.

FIG. 1 is a diagram illustrating connections between an apparatus for training a learning system 200 and peripheral elements according to an example of the present disclosure, and FIG. 2 is an explanation diagram illustrating the composition of an apparatus for training a learning system 200 according to an example of the present disclosure.

Referring to FIG. 1, peripheral elements of the apparatus for training a learning system 200 may include a user 100, a word database 400, an ungrammatical sentence database 500, an image database 600, and a learning system 300, and the peripheral elements may be connected to the apparatus for training a learning system 200.

The apparatus for training a learning system 200 may collect a keyword that is related to a specific event inputted by the user 100 or a test image. In detail, the user 100 may input, via a user terminal device that is able to communicate with the apparatus for training a learning system 200, a keyword that is related to a specific event, a test image, and an image for measuring reliability. The operation of collecting a keyword that is related to a specific event inputted by the user 100 may be manually executed by the user and be provided by a method, for example, by which a user may directly input a keyword and a search formula in response to a test image. The operation of generating and inputting a relevant keyword from the keyword may be inputted by a user.

According to an example of the present disclosure, regarding the user terminal device, a digital device in which a user can input a keyword by using an integral interface means may be selected as a user terminal device according to an example of the present disclosure. For example, a user terminal device of the present disclosure may be a personal computer (desktop, laptop, etc.), workstation, PDA, web pad, and so on.

In addition, according to an example of the present disclosure, a communication between an apparatus for training a learning system and a user terminal device may be established regardless of the form of communication such as wired or wireless communication, and it may be established in various communication networks, such as a Local Area Network (LAN), Metropolitan Area Network (MAN), Wide Area Network (WAN), World Wide Web (WWW), etc.

The apparatus for training a learning system 200 may be connected to the word database 400, ungrammatical sentence database 500, and image database 600, and the apparatus for training a learning system 200 may collect an image by a series of method by inputting a keyword that is related to a specific event that is selected by a user and a test image and may train and retrain a learning system 300 by using the collected image.

According to an example, a learning system 300 may refer to any system that is able to configure criteria for determination with a use of input data or existing data as training data and retraining data by using a learning algorithm or method in a way of Artificial Intelligence. The learning algorithm or method may include an Artificial Neural Network (ANN), a decision tree, a K-means, a K-Nearest Neighbor of Pattern Recognition, a support vector machine which is a supervised learning model for Pattern Recognition • data analysis, clustering which divides observed examples into groups of a cluster, etc.

According to another example of the present disclosure, a learning system 300 may be a learning system using Deep Learning algorithm. Deep Learning algorithm may refer to an algorithm related to machine learning techniques based on artificial neuron networks so that a computer is able to train by itself by using various data as if it is a human; therefore, it enables the computer to expressly process by collecting and analyzing necessary data by itself without receiving stereotypical data when a computer executes a specific work. It adopts an unsupervised learning method that studies by itself by going through a pre-training process in which data is inputted in advance, comparing inputted data, and finding and classifying characteristics among data.

According to an example of the present disclosure, the word database 400 may refer to a group of data that is information on words and that is related to each other but not overlap.

According to an example of the present disclosure, the ungrammatical sentence database 500 is a group of data that is information on an ungrammatical sentence or homonym and that is related to each other but not overlap.

According to an example of the present disclosure, the image database 600 is a group of data that is information on an image or video and that is related to each other but not overlap.

Referring to FIG. 2, apparatus for training a learning system 200 according to an example of the present disclosure may include a training system unit 210, a first retraining system unit 220, a second retraining system unit 230, and a third retraining system unit 240. The training system unit 210 may be connected to a word database 400, ungrammatical sentence database 500, image database 600, and learning system 300, and the first retraining system unit 220 to third retraining system unit 240 may be connected to an image database 600 and learning system 300.

According to an example of the present disclosure, the training system unit 210 may train a learning system 300 by being connected to a word database 400, ungrammatical sentence database 500, and image database 600, by using a keyword that is related to a specific event selected by a user 100, and by collecting an image in a series of method and using the collected image. The keyword may be manually inputted by the user.

According to an example of the present disclosure, the second retraining system unit 230 may retrain the trained learning system 300 by being connected to an image database 600 and by using a camera image collected to collect an image in a series of method and using the collected image.

According to an example of the present disclosure, the third retraining system unit 240 may, by being connected to an image database 600 and by collecting and using an image in a series of method based on a reliability measurement image selected by a user 100 and the reliability of the retrained learning system 300, retrain the retrained learning system 300.

Figure 3:
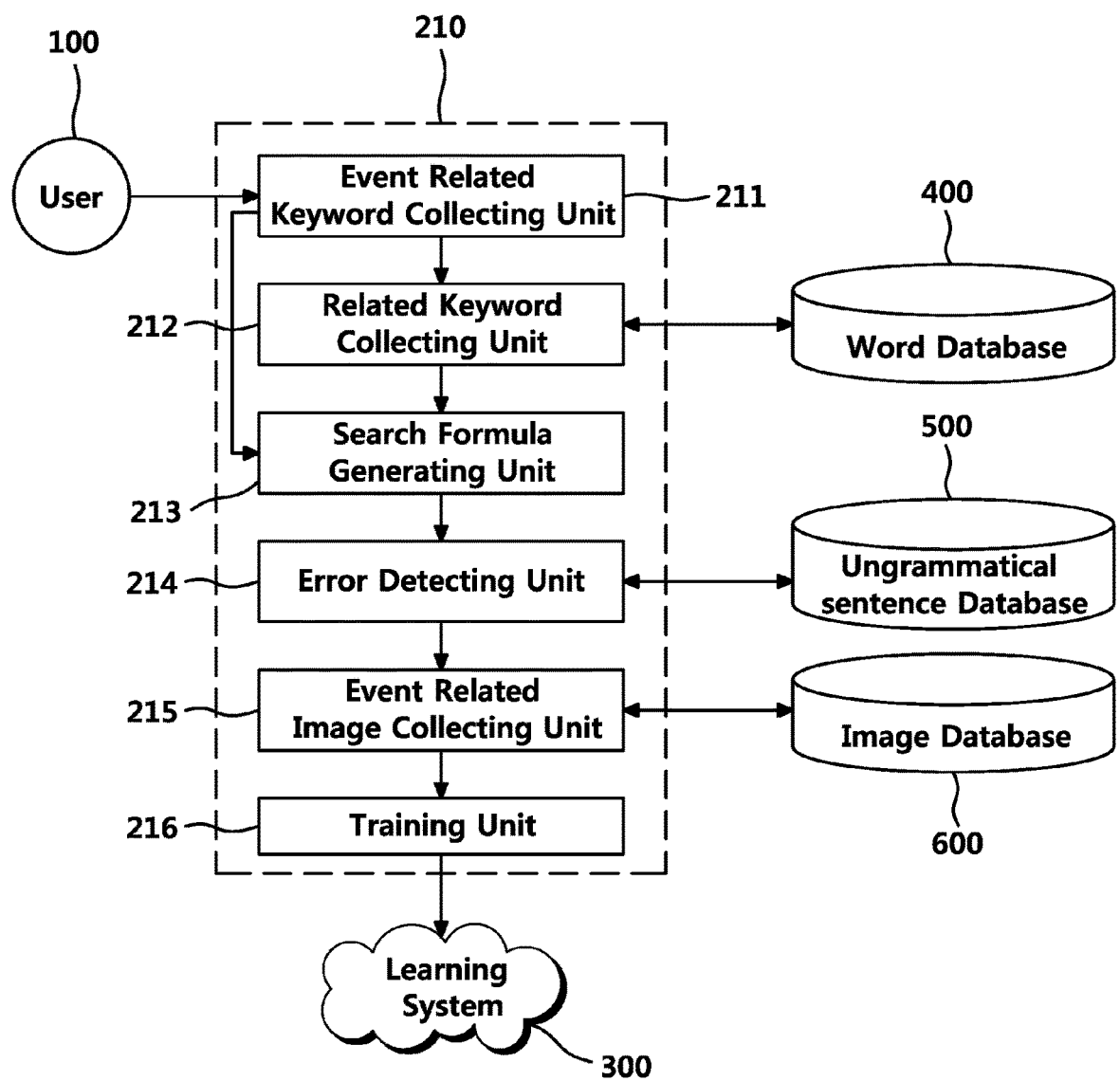
FIG. 3 is an explanation diagram illustrating a training system unit according to an example of the present disclosure.

FIG. 3 is an explanation diagram illustrating the composition of a training system unit 210 according to an example of the present disclosure.

Referring to FIG. 3, a training system unit 210 according to an example of the present disclosure may include an event related keyword collecting unit 211, a related keyword collecting unit 212, a search formula generating unit 213, an event related image collecting unit 215, and a training unit 216.

According to an example of the present disclosure, the event related keyword collecting unit 211 may receive at least one keyword related to a specific event from a user 100 and set the keyword as an event related keyword and may transmit the event related keyword to the related keyword collecting unit 212 and search formula generating unit 213.

For example, if a specific event that is supervised by apparatus for training a learning system 200 is fire, the event related keyword collecting unit 211 receives an input of the keyword "fire" from a user 100, sets the keyword "fire" as an event related keyword, and transmits the event related keyword to a related keyword collecting unit 212 and search formula generating unit 213.

Hereinabove, the present disclosure is explained by referring to the example above, but it is obvious to those skilled in the art that various modifications and changes can be made thereto without departing from the broader spirit and scope of the disclosure.

According to an example of the present disclosure, the related keyword collecting unit 212 may transmit the collected event related keyword to a word database 400 to collect at least one related keyword and transmit the related keyword to a search formula generating unit 213.

The related keyword may be a synonym, equivalent term, related term, foreign word, etc. and may include at least one word.

The related term may include a related word that limits, specifies, or details the meaning of event related keyword.

For example, if the event related keyword is fire, the related keyword may include the terms "fire," "flame," "fire on building," "fire on tunnel," "fire," "conflagration," etc.

Hereinabove, the present disclosure is explained by referring to the example above, but it is obvious to those skilled in the art that various modifications and changes can be made thereto without departing from the broader spirit and scope of the disclosure.

According to an example of the present disclosure, the word database 400 may provide a synonym, equivalent term, foreign word, etc. to a related keyword collecting unit by being connected to a related keyword collecting unit 212, and the word database 400 may include a synonym dictionary database, an equivalent term dictionary database, a foreign term dictionary database, etc.

According to an example of the present disclosure, the search formula generating unit 213 may generate at least one search formula for a related keyword that is collected via the event related keyword and related keyword collecting unit 212 and transmit the generated search formula to an event related image collecting unit 215.

The search formula may be entered by at least one word and may be include an event related keyword or related keyword. For example, a search formula regarding the related keyword "fire" may be the term "fire on building," "fire on house," etc. The search formula regarding related keyword may be manually entered by a user or be automatically created by the search formula generating unit 213.

Hereinabove, the present disclosure is explained by referring to the example above, but it is obvious to those skilled in the art that various modifications and changes can be made thereto without departing from the broader spirit and scope of the disclosure.

The search formula generating unit 213 may further include an error detecting unit 214, and the error detecting unit 214 may detect whether the search formula is ungrammatical based on an algorithm of detecting ungrammatical sentences by being connected to an ungrammatical sentence database 500 or detect whether the search formula has an error resulting from a homonym of the event related keyword or related keyword.

According to an example of the present disclosure, the ungrammatical sentence database 500 may include an ungrammatical sentence dictionary database, homonym dictionary database, etc.

According to an example of the present disclosure, the event related image collecting unit 215 may transmit an event related image to an image database and, thus, collect at least one event related image related to the search formula from the image database. In detail, the event related image collecting unit 215 may make a request to an image database 600 via the at least one search formula and, thus, collect at least one event related image, which is a result of searching each individual search formula, and the event related image to a training unit 216. The image database 600 may include an image search engine, etc.

According to an example of the present disclosure, the training unit 216 may train a learning system 300 by communicating with the learning system with a use of the event related image as training data. In detail, the training unit 216 may receive the event related image from the image collecting unit 215 and transmit the event related image to the learning system 300.

The learning system 300 that received the event related image may be trained by using the event related image as training data, and the learning system 300 may set criteria for determination of an image that is related to a specific event and sustainably update it.

For example, in the case that an event related image is at least one image as a result of searching the search formula "fire on building," the learning system 300 may find a regular pattern and make a Feature Map. The learning system 300 may analyze, process, and train event related images of the search formula "fire on building" and, then, classify them as images showing that a fire breaks out in building and images showing that no fire in building. The criteria for determination that is set in the classification operation may include features that are extracted from each operation of Feature Map while the learning system 300 classifying event related images.

Hereinabove, the present disclosure is explained by referring to the example above, but it is obvious to those skilled in the art that various modifications and changes can be made thereto without departing from the broader spirit and scope of the disclosure.

According to an example of the present disclosure, in the case that at least one keyword that is related to a specific event is newly entered by a user, the training system unit 210 may repeat the operation. This repetition may enable a user 100 to set a specific event to be detected by a video surveillance system in which the apparatus for training a learning system 200 is implemented after the video surveillance system is installed.

Figure 4:
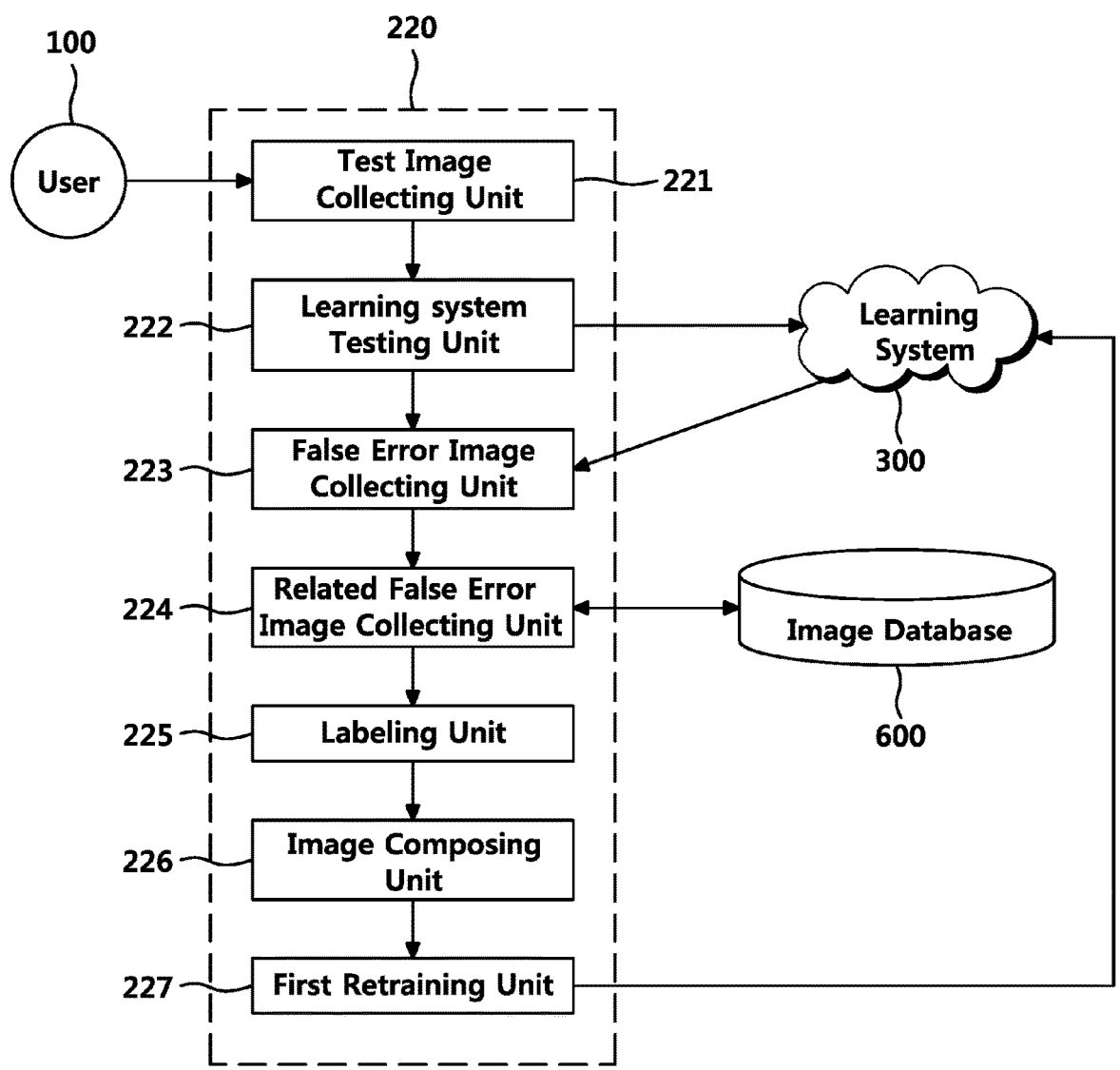
FIG. 4 is an explanation diagram illustrating a first retraining system unit according to an example of the present disclosure.

FIG. 4 is an explanation diagram illustrating the composition of a first retraining system unit according to an example of the present disclosure.

Referring to FIG. 4, a first retraining system unit 220 according to an example of the present disclosure may include a test image collecting unit 221, a learning system testing unit 222, a false error image collecting unit 223, a related false image collecting unit 224, a labeling unit 225, and a first retraining unit 227.

According to an example of the present disclosure, the test image collecting unit 221 may collect at least one test image that is inputted by a user 100 and transmit the test image to the learning system testing unit 222. The test image may include an image that is labeled as an event positive or an event negative based on whether an event occurs in a test image, as ground truth data (verification data for evaluating the performance of video recognition or video tracking algorithm).

For example, in the case that the learning system 300 is trained as an event related image regarding the search formula "fire on building," a user 100 may input an image showing that a fire breaks out and image showing that no fire breaks out in a test image as a test image in order to test the learning system 300. In this case, the image that showing that a fire breaks out in a test image is labeled as fire positive, and the image showing that no fire breaks out in a test image is labeled as fire negative.

Hereinabove, the present disclosure is explained by referring to the example above, but it is obvious to those skilled in the art that various modifications and changes can be made thereto without departing from the broader spirit and scope of the disclosure.

According to an example of the present disclosure, the learning system testing unit 222 may test the trained learning system 300 by using the test image. In the case that the probability that an event in the test image is a specific event is greater than or equal to a predetermined probability value, trained learning system 300 may determine the test image as an image showing that a specific event occurs.

According to an example of the present disclosure, the predetermined probability value may be set by a user without limitation, for example, 80%.

In addition, a result that the learning system testing unit 222 tests the trained learning system 300 may include at least one of "true positive," "false positive," "false negative" and "true negative." The true positive may be the case that, regarding a test image that is labeled as event positive, the learning system 300 determines that an event occurs in a test image. The false positive may be the case that, regarding a test image that is labeled as event negative, the learning system 300 determines that an event occurs in a test image. The false negative may be a case that, regarding a test image that is labeled as event positive, the learning system 300 determines that an event does not occur in a test image. The true negative may be a case that, regarding a test image that is labeled as event negative, the learning system 300 determines that an event does not occur in a test image.

For example, in the case that a learning system 300 is trained as an event related image regarding the search formula "fire on building" and that a user inputs an image that is labeled as fire positive and an image that is labeled as fire negative as a test image to the learning system 300, the learning system 300 may determine as an image related to fire when the probability that an event in the test image is a fire is greater than or equal to a predetermined probability value. As a result of determining an image that is labeled as fire positive by the learning system 300, if it is determined as an image related to fire, it corresponds to "true positive"; as a result of determining an image that is labeled as fire negative, if it is determined as an image related to fire, it corresponds to "false positive"; as a result of determining an image that is labeled as fire positive, it corresponds to "false negative"; and as a result of determining an image that is labeled as fire negative, it corresponds to "true negative."

Hereinabove, the present disclosure is explained by referring to the example above, but it is obvious to those skilled in the art that various modifications and changes can be made thereto without departing from the broader spirit and scope of the disclosure.

According to an example of the present disclosure, the false error image collecting unit 223 may collect an image of false positive or an image of false negative of the result that the learning system testing unit 222 tests the trained learning system 300, as a false error image.

The image of false positive may be an image that is determined as an image related to an event by the learning system 300 among test images labeled as event negative, and the image of false negative may be an image that is determined as an image not related to an event by the learning system 300 among test images labeled as event positive.

For example, in the case that a learning system 300 is trained as an event related image regarding the search formula "fire on building" and that a user inputs an image that is labeled as fire positive and an image that is labeled as fire negative as a test image to the learning system 300, as a result that the learning system testing unit 222 tests a trained learning system 300, an image that is determined as an image related to fire by the learning system 300 among test images labeled as fire negative is a false positive image, and an image that is determined as an image not related to fire by the learning system 300 among test images labeled as fire positive is a false negative image.

Hereinabove, the present disclosure is explained by referring to the example above, but it is obvious to those skilled in the art that various modifications and changes can be made thereto without departing from the broader spirit and scope of the disclosure.

According to an example of the present disclosure, the related false image collecting unit 224 may transmit the images of false positive and false negative to an image database 600 and, thus, collect from the image database 600 at least one image related to false positive image and at least one image related to false negative image.

According to an example of the present disclosure, the image database 600 may include an image search engine, etc.

According to an example of the present disclosure, the labeling unit 225 may label the image related to false positive image as an event nonoccurrence image and label an event occurrence image.

According to an example of the present disclosure, the labeling unit 225 may further include an image composing unit 226 that composes the event nonoccurrence image and an event-occurrence portion of event occurrence image and, thereby, labels it as an event occurrence image.

For example, the labeling unit 225 may label an image related to false positive image that is related to fire as a fire nonoccurrence image and label an image related to false negative image that is related to fire as a fire nonoccurrence image. In addition, the image composing unit 226 may compose the portion of the fire occurrence image that is related to fire to a fire nonoccurrence image and, thereby, label the composed image as a fire occurrence image.

Hereinabove, the present disclosure is explained by referring to the example above, but it is obvious to those skilled in the art that various modifications and changes can be made thereto without departing from the broader spirit and scope of the disclosure.

In addition, according to an example of the present disclosure, the labeling unit 225 may transmit the event nonoccurrence image and the event occurrence image to a first retraining unit 227, and the image composing unit 226 may the event occurrence image and event nonoccurrence image to a learning system 300.

For example, in the case that an event related image is at least one image as a result of searching the search formula "fire on building," the learning system 300 may find a regular pattern based on the event related image and make a Feature Map. The learning system 300 may analyze, process, and train event related images of the search formula "fire on building" and, thereby, classify them as images showing that a fire breaks out in building and images showing that no fire in building. The criteria for determination that is set in the classification operation may include features that are extracted from each operation of Feature Map while the learning system 300 classifying event related images.

Hereinabove, the present disclosure is explained by referring to the example above, but it is obvious to those skilled in the art that various modifications and changes can be made thereto without departing from the broader spirit and scope of the disclosure.

The learning system 300 that receives the event occurrence image and event nonoccurrence image may be trained by using the event occurrence image and event nonoccurrence image as retraining images, and the learning system 300 may set and sustainably update criteria for determination of an image that is related to a specific event. In this case, the operation of supplementing criteria for determination that is related to a specific event based on the event occurrence image and event nonoccurrence image may be further included.

For example, a learning system 300 that is trained based on an event related image regarding the search formula "fire on building" may make a Feature Map by finding a regular pattern and supplement the criteria for determination by using features extracted from each operation.

Hereinabove, the present disclosure is explained by referring to the example above, but it is obvious to those skilled in the art that various modifications and changes can be made thereto without departing from the broader spirit and scope of the disclosure.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims. Accordingly, the scope of the present disclosure shall be determined only according to the attached claims.

According to an example of the present disclosure, the first retraining unit 220 may repeat the above operation when a test image is newly inputted. Via this operation, a user 100 may sustainably test and retrain the learning system 300 and, thereby, improve the reliability.

Figure 5:
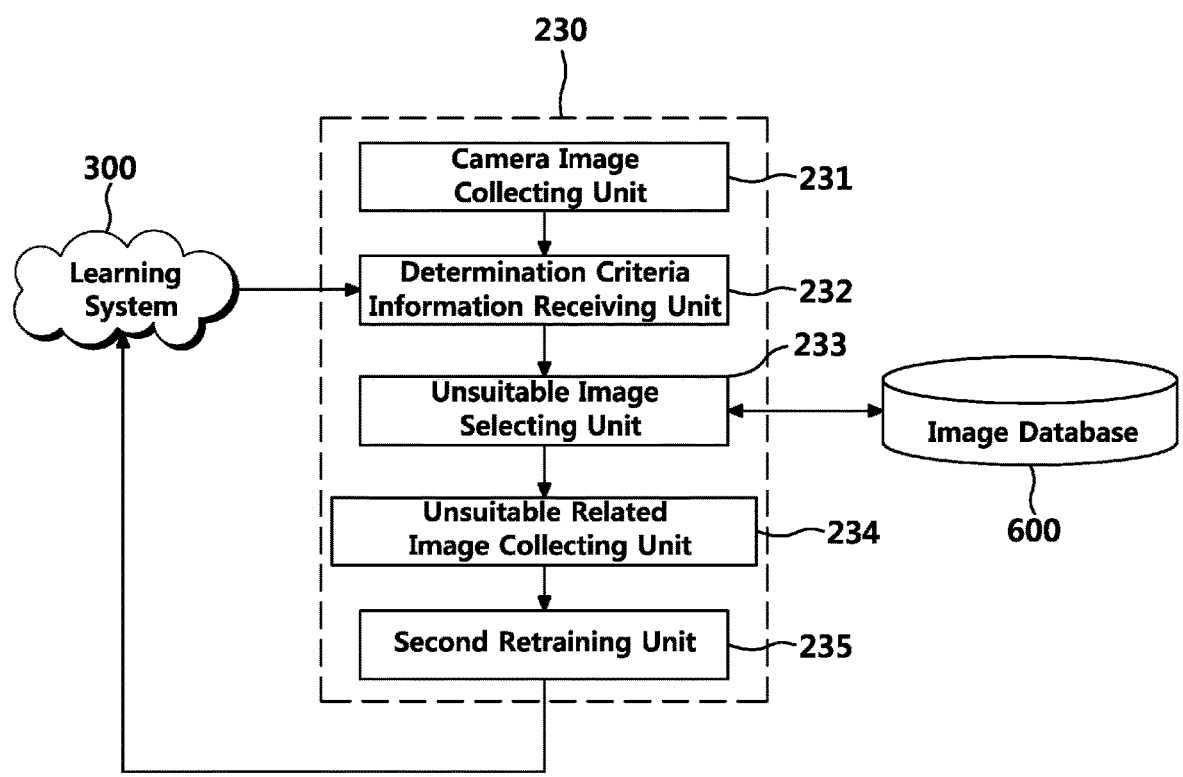
FIG. 5 is an explanation diagram illustrating a second retraining system unit according to an example of the present disclosure.

FIG. 5 is an explanation diagram illustrating the composition of a second retraining system unit 230 according to an example of the present disclosure.

Referring to FIG. 5, a second retraining system unit 230 according to an example of the present disclosure may include a camera image collecting unit 231, a determination criteria information receiving unit 232, an unsuitable image selecting unit 233, an unsuitable related image collecting unit 234, and a second retraining unit 235.

According to an example of the present disclosure, the camera image collecting unit 231 may collect at least one camera image via a camera and transmit the image to an unsuitable image selecting unit 233.

According to an example of the present disclosure, the camera may include a camera that is installed in an apparatus for training a learning system 200 or a video surveillance system where apparatus for training a learning system 200 is implemented.

In addition, according to an example of the present disclosure, the camera image is an image or video and not limited to an image or video that is related to events monitored by a device where an apparatus for training a learning system 200 is installed. The camera image may include every image or video that is taken via the camera.

For example, in the case that a video surveillance system where apparatus for training a learning system 200 is implemented is CCTV, the camera image collecting unit 231 collects at least one camera image via a camera installed in the CCTV.

Hereinabove, the present disclosure is explained by referring to the example above, but it is obvious to those skilled in the art that various modifications and changes can be made thereto without departing from the broader spirit and scope of the disclosure.

In addition, according to an example of the present disclosure, the camera may be implemented to have a RGB-IR sensor. In this case, compared to a camera having only an IR sensor, a camera image may be collected with colorful information at night, thereby an effect of increasing the reliability in detecting a specific event may be expected.

According to an example of the present disclosure, the determination criteria information receiving unit 232 may communicate with a learning system 300 that is trained by the training system unit 210 or a learning system 300 that is retrained by the first retraining system unit 220 and, thereby, the determination criteria information receiving unit 232 may receive at least one criterion for determination of training data of a learning system 300 from the learning system 300 and transmit the criterion for determination to a unsuitable image selecting unit 233.

According to an example of the present disclosure, the unsuitable image selecting unit 233 may select at least one unsuitable image that is determined to have no occurred event based on the criterion for determination from the camera image and transmit the unsuitable image to the unsuitable related image collecting unit 234.

For example, in the case that at least one camera image is collected via a camera installed in CCTV and a criterion for determination related to fire is received, the unsuitable image selecting unit 233 may determine the camera image based on the criterion for determination and, thereby, select an image that is not related to fire from the camera image and transmit the unsuitable image to the unsuitable related image collecting unit 234.

Hereinabove, the present disclosure is explained by referring to the example above, but it is obvious to those skilled in the art that various modifications and changes can be made thereto without departing from the broader spirit and scope of the disclosure.

According to an example of the present disclosure, the unsuitable related image collecting unit 234 may transmit the unsuitable image to an image database 600 and, thereby, collect an unsuitable related image which is related to an suitable image from the image database 600 and transmit the unsuitable related image to the second retraining unit 235.

According to an example of the present disclosure, the image database 600 may include an image search engine. According to an example of the present disclosure, the second retraining unit 235 may receive the unsuitable related image from an unsuitable related image collecting unit 234 and retrain a learning system 300 by using the unsuitable related image. The learning system 300 that received the unsuitable related image may be retrained by using the unsuitable related image as retraining data, and the learning system 300 may reset and sustainably update a criterion for determination of an image that is related to a specific event.

For example, a learning system 300 that is trained as an event related image regarding the search formula "fire on building" may find a regular pattern based on an unsuitable related image and, thereby, make a Feature Map and supplement a criterion for determination by using features that are extracted from each operation.

The second retraining system unit 230 may repeat the above-mentioned operations when a camera image is newly collected via a camera. This repetition may enable the reliability of a learning system 300 to be increased by sustainably testing and retraining the learning system 300.

Hereinabove, the present disclosure is explained by referring to the example above, but it is obvious to those skilled in the art that various modifications and changes can be made thereto without departing from the broader spirit and scope of the disclosure.

Figure 6:
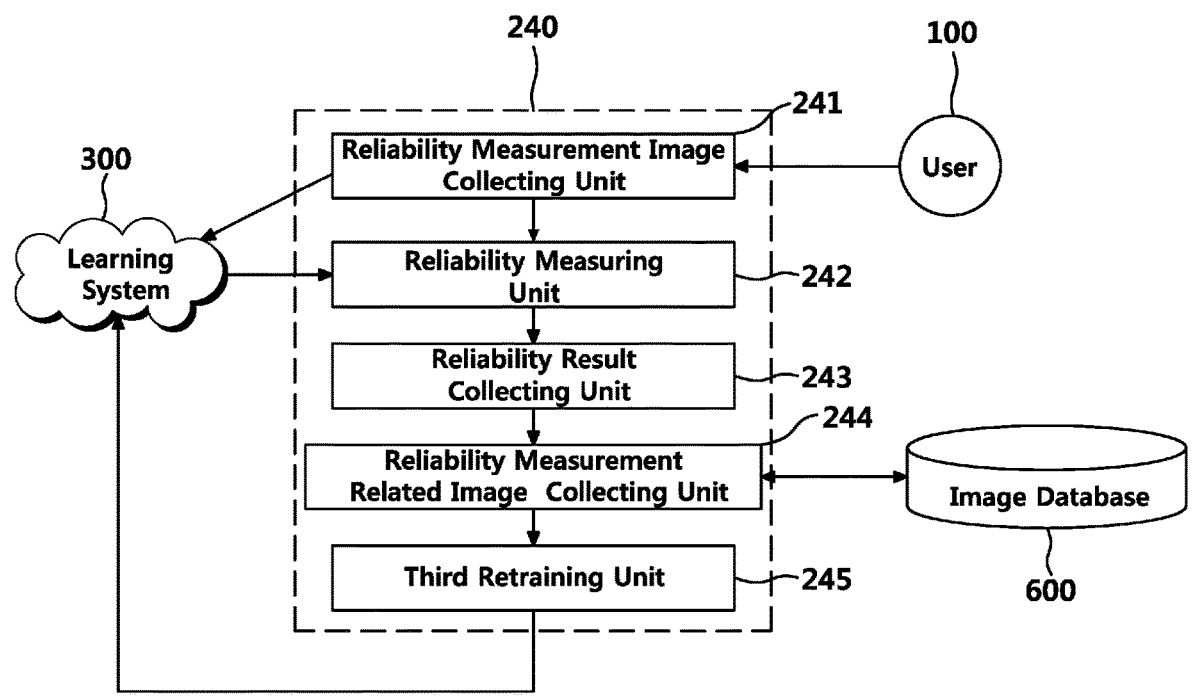
FIG. 6 is an explanation diagram illustrating a third retraining system unit according to an example of the present disclosure.

FIG. 6 is an explanation diagram illustrating the composition of a third retraining system unit 240 according to an example of the present disclosure.

Referring to FIG. 6, a third retraining system unit 240 according to an example of the present disclosure, may include a reliability measurement image collecting unit 241, a reliability measuring unit 242, an event nonoccurrence determination unit 243, an event nonoccurrence related image collecting unit 244, and a third retraining unit 245.

According to an example of the present disclosure, the reliability measurement image collecting unit 241 may collect at least one reliability measurement image inputted by a user 100 and transmit the reliability measurement image to a reliability measuring unit 242. The reliability measurement image may include any image or video inputted by a user.

According to an example of the present disclosure, the reliability measuring unit 242 may use the reliability measurement image and, thereby, measure the reliability of a learning system 300 that is retrained by the first retraining unit 227 or second retraining unit 235. In detail, the reliability measuring unit 242 may transmit a reliability measurement image to a learning system 300 and receive a determination of learning system 300 regarding the reliability measurement image.

According to an example of the present disclosure, the determination may include a probability that is related to a specific event of the reliability measurement image of the retrained learning system 300.

According to an example of the present disclosure, in the case that the reliability is less than a threshold value, the retrained learning system 300 may internally specify an event of reliability measurement image and suggest a probability thereof.

According to an example of the present disclosure, the reliability result collecting unit 243 may collect a reliability measurement image from the retrained learning system 300 if the reliability is less than a threshold value.

For example, in the case that a learning system 300 may be trained as an event related image regarding the search formula "fire on building" and be retrained as a test image and that, as a result of measuring a reliability of the learning system 300 with a reliability measurement image related to "bulb," the reliability is less than a threshold value, the reliability result collecting unit 243 may collect the reliability measurement image.

Hereinabove, the present disclosure is explained by referring to the example above, but it is obvious to those skilled in the art that various modifications and changes can be made thereto without departing from the broader spirit and scope of the disclosure.

According to an example of the present disclosure, the event nonoccurrence related image collecting unit 244 may transmit the reliability measurement image to an image database 600 and, thereby, collect a reliability measurement related image that is related to a reliability measurement image from an image database and then transmit the reliability measurement related image to a third retraining unit 245. The image database 600 may include an image search engine.

According to an example of the present disclosure, the third retraining unit 245 may retrain a learning system 300 by communicating with the learning system 300 with a use of the reliability measurement related image as retraining data.

The learning system 300 that received a reliability measurement related image may be retrained by using the reliability measurement related image as retraining data, and the learning system 300 may reset a criterion for determination of an image related to a specific event and sustainably update it. In this case, the operation of supplementing criteria for determination that is related to a specific event based on the event occurrence image and event nonoccurrence image may be further included.

For example, a learning system 300 that is retrained to have a reliability measurement related image that is related to "bulb" make a Feature Map by finding a regular pattern based on the reliability measurement related image that is related to "bulb" and complement a criterion for determination by using features extracted from each operation.

Hereinabove, the present disclosure is explained by referring to the example above, but it is obvious to those skilled in the art that various modifications and changes can be made thereto without departing from the broader spirit and scope of the disclosure.

According to an example of the present disclosure, the third retraining system unit 240 may repeat the above-mentioned operation if a reliability measurement image is newly inputted by a user 100. This repetition may enable the reliability of a learning system 300 to be increased by sustainably testing and retraining the learning system 300.

Figure 7:
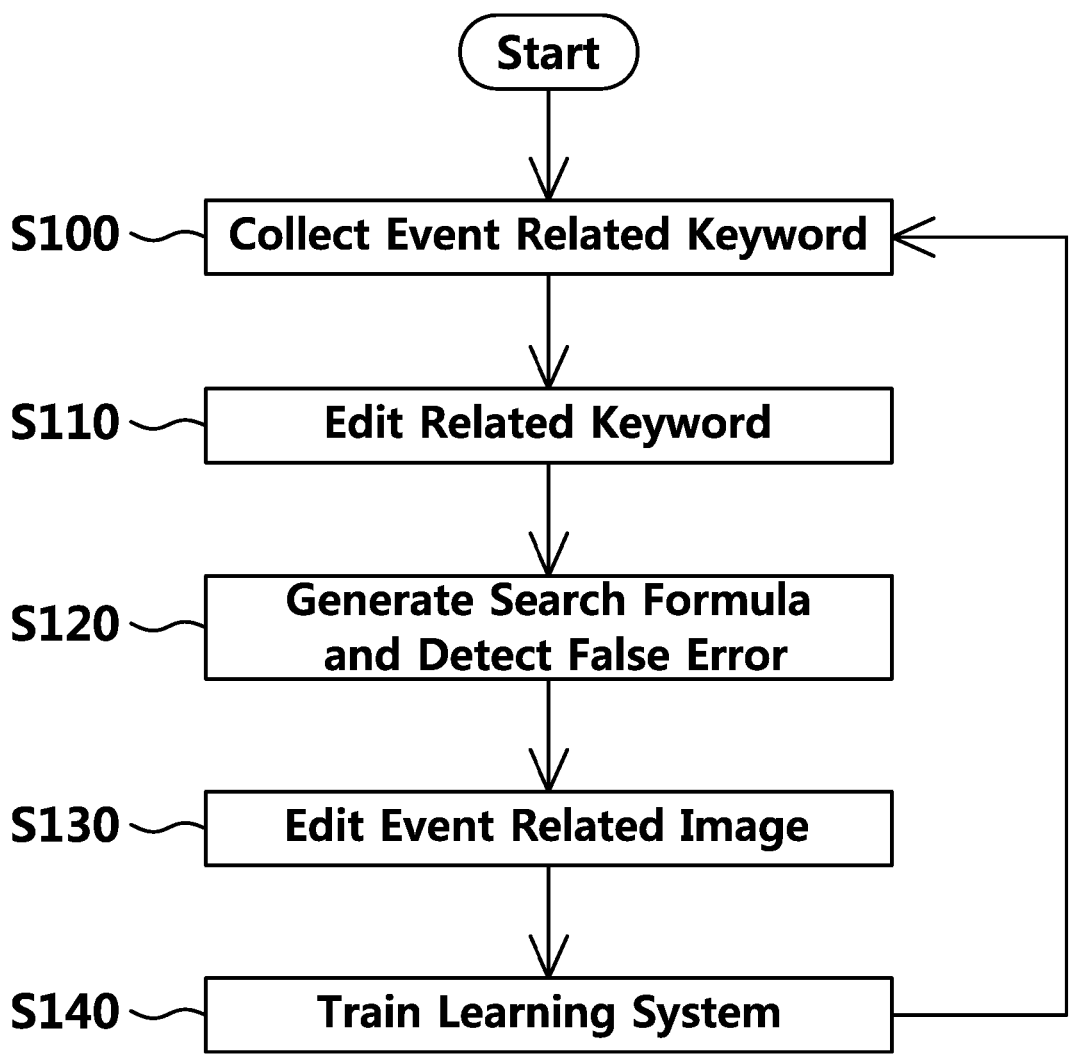
FIG. 7 is a flow chart of a training system unit according to an example of the present disclosure.

FIG. 7 is a flow chart of a training system unit 210 according to an example of the present disclosure. Referring to FIG. 7, an apparatus for training a learning system 200 according to an example of the present disclosure may include the operation that an event related keyword collecting unit 211 collects an event related keyword from a user 100 (S100), the operation that a related keyword collecting unit 212 collects an related keyword that is related to the event related keyword by using a word database 400 (S110), the operation that a search formula generating unit 213 generates search formulas the event related keyword and related keyword and detects an error of the search formula (S120), the operation that an event related image collecting unit 215 collects an event related image that is related to the search formula by using an image database 600 (S130), and the operation that a training system unit trains a learning system by using the event related image as training data (S140). In addition, the operations S100 to S140 may be repeated when at least one keyword that is related to a specific event is newly inputted by a user 100.

Figure 8:
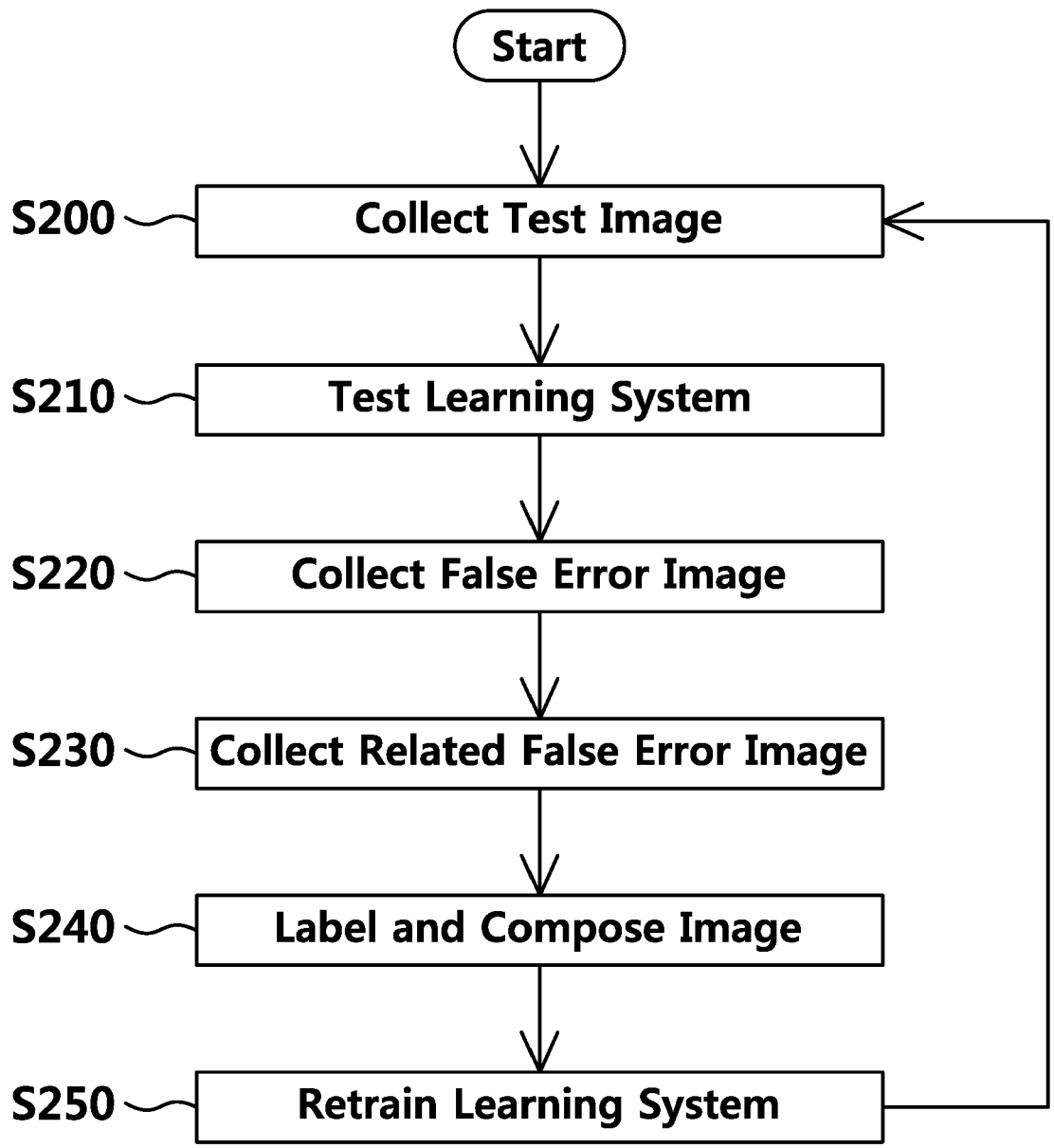
FIG. 8 is a flow chart of a first retraining system unit according to an example of the present disclosure.
Figure 9:
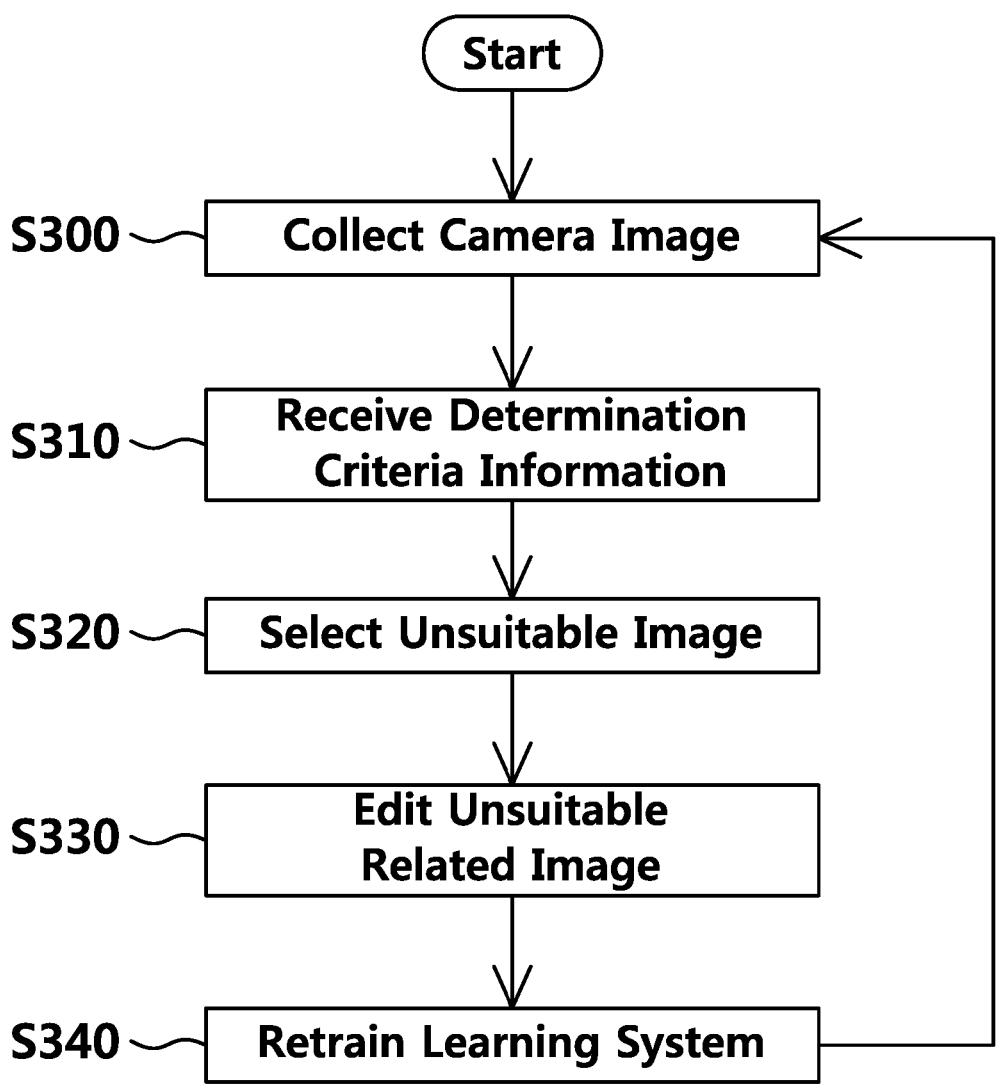
FIG. 9 is a flow chart of a second retraining system unit according to an example of the present disclosure.

FIG. 8 is a flow chart of a first retraining system unit 220 according to an example of the present disclosure. Referring to FIG. 8, an apparatus for training a learning system 200 according to an example of the present disclosure may include the operation that a test image collecting unit 221 collects a test image from a user 100 (S200), the operation that a learning system test unit 222 tests a learning system 300 that is trained by the flowchart of FIG. 7 to the test image (S210), the operation that a false error image collecting unit 223 collects a false positive image and a false negative image from the tested learning system 300 (S220), the operation that a related false error image collecting unit 224 collects a false positive related image and false negative related image that are related to the false positive image and false negative image by using an image database 600 (S230), the operation that a labeling unit 255 labels the false positive related image as an event occurrence image and labels the false negative related image as an event nonoccurrence image, and an image composing unit 226 composites the event nonoccurrence image and a portion of event occurred of the event occurrence image and labels the composited image as an event occurrence image (S240), and the operation that the first retraining unit 227 retrains the learning system 300 by using an event occurrence image and an event nonoccurrence image. In addition, the operations S200 to S250 may be repeated when a test image that is inputted by a user 100 changes FIG. 9 is a flow chart of a second retraining system unit 230 according to an example of the present disclosure. Referring to FIG. 9, an apparatus for training a learning system 200 according to an example of the present disclosure may include the operation that a camera image collecting unit 231 collects camera images obtained via a camera installed in a video surveillance system in which an apparatus for training a learning system 200 is implemented (S300), the operation that a determination criteria information receiving unit 232 receives a criterion for determination from a learning system 300 that is trained by the flowchart of FIG. 7 or a learning system 300 that is retrained by the flowchart of FIG. 8 (S310), the operation that a unsuitable image selecting unit 233 selects an unsuitable image that is determined due to the nonoccurrence of event when it is determined based on the criterion for determination (S320), the operation that an unsuitable related image collecting unit 234 collects an unsuitable related image that is related to the unsuitable image by using an image database 600 (S330), and the operation that a second retraining unit 235 retrains the learning system 300 by using the unsuitable related image as retraining data (S340). In addition, the operations S300 to S340 may be repeated when a camera image is newly collected via a camera.

Figure 10:
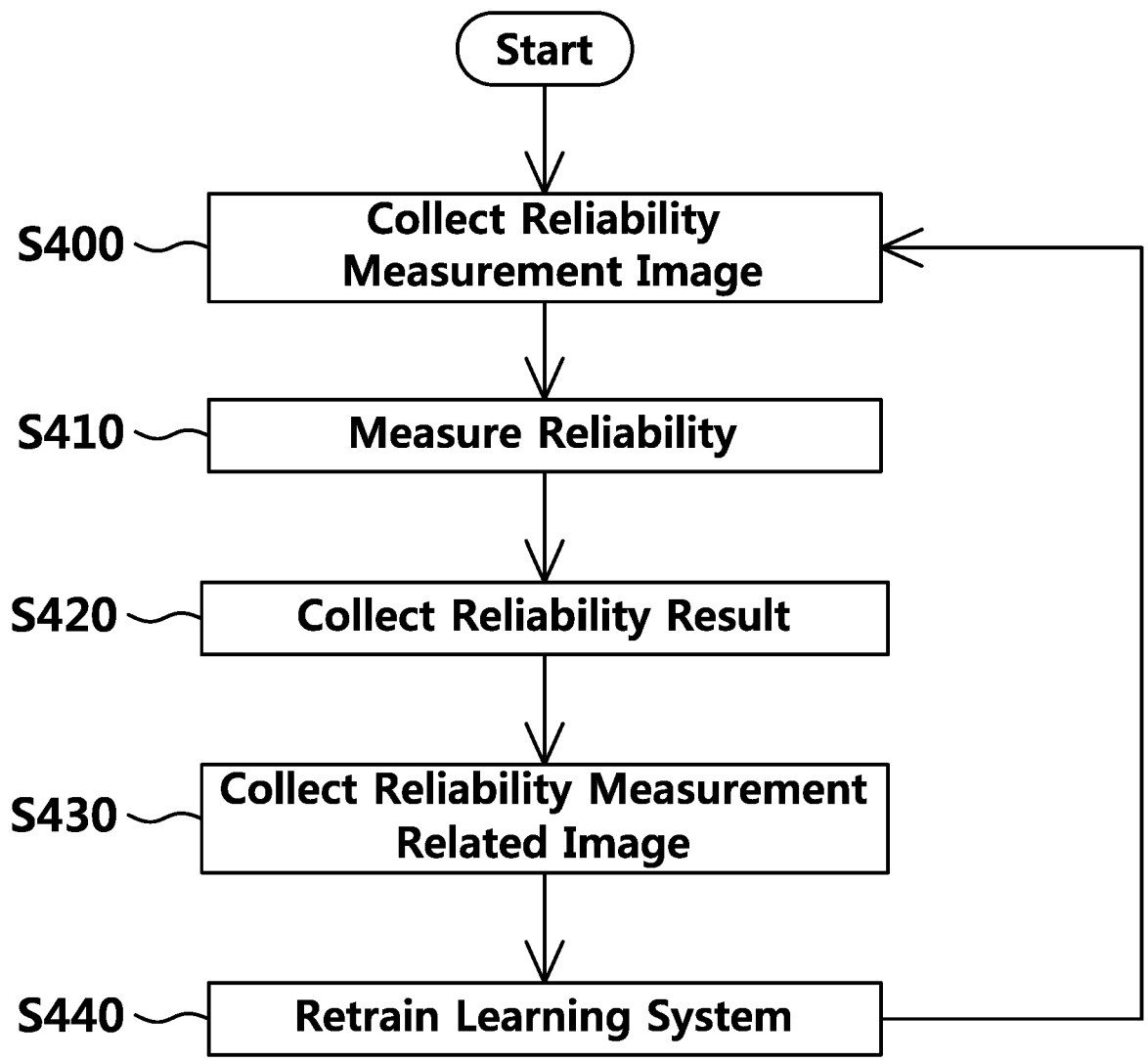
FIG. 10 is a flow chart of a third retraining system unit according to an example of the present disclosure.

FIG. 10 is a flow chart of a third retraining system unit 240 according to an example of the present disclosure. Referring to FIG. 10, an apparatus for training a learning system 200 according to an example of the present disclosure may include the operation that a reliability measurement image collecting unit 241 collects reliability measurement images from a user (S400), a reliability measuring unit 242 measure the reliability of a learning system 300 retrained as the reliability measurement image by the flowchart of FIG. 8 or 9 (S410), the operation that a reliability result collecting unit 243 collects the reliability measurement image from the learning system 300 when the reliability value is less than a threshold value (S420), the operation that a reliability measurement related image collecting unit 244 collects a reliability measurement related image that is related to the reliability measurement image by using an image database 600 (S430), and the operation that a third retraining unit 245 retrains the learning system 300 by using the reliability measurement related image as retraining data. In addition, the operations S400 to S440 may be repeated when a reliability measurement image is newly inputted by a user 100.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims. Accordingly, the scope of the present disclosure shall be determined only according to the attached claims.

What is claimed is:

1. Apparatus for training a learning system comprising:
    an event related keyword collecting unit that collects an event related keyword inputted by a user;
    a related keyword collecting unit that collects, by transmitting the event related keyword to a word database, at least one related keyword from the word database;
    a search formula generating unit that generates at least one search formula regarding the event related keyword and related keyword;
    an image collecting unit that collect, by transmitting the search formula to an image database, at least one event related image that is related to the search formula from the image database; and
    a training unit trains a learning system by communicating with the learning system with a use of the event related image as training data;
    a test image collecting unit that collects at least one test image inputted by a user;
    a learning system testing unit that tests the trained learning system based on the test image;
    a false error image collecting unit that collects at least one false positive image and at least one false negative image from the learning system;
    an related false error image collecting unit that collects, by transmitting the false positive image and false negative image to the image database, at least one false positive related image that is related to the false positive image and at least one false negative related image that is related to the false negative image from the image database;
    a labeling unit that labels the false positive related image as an event occurrence image and labels the false negative related image as an event nonoccurrence image; and
    a first retraining unit that retrains a learning system by communicating with the learning system with a use of the event occurrence image and event nonoccurrence image as retraining data.

2. The apparatus of claim 1, wherein the search formula generating unit comprise an error detecting unit that detects, by transmitting the search formula to an ungrammatical sentence database, an error regarding the search formula and excludes a formula having a false error.

3. The apparatus of claim 1, wherein the labeling unit further comprises an image composing unit that labels a composite image as an event occurrence image by composing the event nonoccurrence image and an event occurred portion of the event occurrence image.

4. The apparatus of claim 1, further comprising:
    a reliability measurement image collecting unit that collects at least one reliability measurement image inputted by a user;
    a reliability measuring unit that measures a reliability value of the retrained learning system based on the reliability measurement image;
    a reliability result collecting unit that collects the reliability measurement image from the learning system if the reliability value is less than a threshold value;
    a reliability measurement related image collecting unit that collects, by transmitting the reliability measurement image to the image database, at least one reliability measurement related image that is related to the reliability measurement image from the image database; and
    a third retraining unit that retrains a learning system by communicating with the learning system with a use of the reliability measurement related image as retraining data.

5. Apparatus for training a learning system comprising:
    an event related keyword collecting unit that collects an event related keyword inputted by a user;
    a related keyword collecting unit that collects, by transmitting the event related keyword to a word database, at least one related keyword from the word database;
    a search formula generating unit that generates at least one search formula regarding the event related keyword and related keyword;
    an image collecting unit that collect, by transmitting the search formula to an image database, at least one event related image that is related to the search formula from the image database; and
    a training unit trains a learning system by communicating with the learning system with a use of the event related image as training data;
    a camera image collecting unit that collects at least one camera image obtained via a camera;
    a determination criteria information receiving unit that receives at least one criterion for determination regarding the training data from the learning system by communicating with the trained learning system;
    an unsuitable image selecting unit that selects, from the camera image, at least one unsuitable image that is determined as an event nonoccurrence image based on the at least one criterion for determination;
    an unsuitable related image collecting unit that collects, by transmitting the unsuitable image to the image database, at least one unsuitable related image that is related to the unsuitable image from the image database; and a second retraining unit that retrains a learning system by communicating with the learning system with a use of the unsuitable related image as retraining data.

6. The apparatus of claim 5, wherein the camera comprises a RGB-IR sensor.

7. The apparatus of claim 5, further comprising:
a reliability measurement image collecting unit that collects at least one reliability measurement image inputted by a user;
a reliability measuring unit that measures a reliability value of the retrained learning system based on the reliability measurement image;
a reliability result collecting unit that collects the reliability measurement image from the learning system if the reliability value is less than a threshold value;
a reliability measurement related image collecting unit that collects, by transmitting the reliability measurement image to the image database, at least one reliability measurement related image that is related to the reliability measurement image; and
a third retraining unit that retrains a learning system by communicating with the learning system with a use of the reliability measurement related image as retraining data.

8. A method for training a learning system comprising:
a first operation of collecting, by an event related keyword collecting unit, an event related keyword inputted by a user;
a second operation of transmitting, by a related keyword collecting unit, the event related keyword to a word database and collecting at least one related keyword from the word database;
a third operation of generating, by a search formula generating unit, at least one search formula that is related to the event related keyword and related keyword;
a fourth operation of transmitting, by an event related image collecting unit, the search formula to an image database and collecting at least one event related image that is related to the search formula from the image database; and
a fifth operation of training, by a training unit, a learning system by communicating with the learning system with a use of the event related image as training data;
a sixth operation of collecting, by a test image collecting unit, at least one test image inputted by a user;
a seventh operation of testing, by a learning system testing unit, the trained learning system based on the test image;
a eighth operation of collecting, by a false image collecting unit, at least one false positive image and at least one false negative image front the learning system;
a ninth operation of transmitting, by a related false image collecting unit, the false positive image and false negative image to the image database and collecting at least one false positive image that is related to the false positive image and at least one false negative image that is related to the false negative image from the image database;
a tenth operation of labeling, by an labeling unit, the false positive related image as an event occurrence image and labeling the false negative related image as an event nonoccurrence image; and an eleventh operation of retraining, by a first retraining unit, a learning system by communicating with the a learning system with a use of the event occurrence image and event nonoccurrence image as retraining data.

9. The method of claim 8, further comprising:
a twelfth operation of collecting, by a reliability measurement image collecting unit, at least one reliability measurement image inputted by a user;
a thirteenth operation of measuring, by a reliability measuring unit, a reliability value of the retrained learning system based on the reliability measurement image;
a fourteenth operation of collecting, by a reliability result collecting unit, a reliability measuring image from the learning system if the reliability value is less than a threshold value;
a fifteenth operation of transmitting, by a reliability measurement related image collecting unit, the reliability measurement image to the image database and collecting at least one reliability measurement related image that is related to the reliability measurement image from the image database; and
a sixteenth operation of retraining, by a third retraining unit, a learning system by communicating with the learning system with a use of the reliability measurement related image as retraining data.

10. The method of claim 9, wherein the sixth to eleventh operations and the twelfth to sixteenth operations are repeated at least twice.

11. A method for training a learning system comprising:
a first operation of collecting, by an event related keyword collecting unit, an event related keyword inputted by a user;
a second operation of transmitting, by a related keyword collecting unit, the event related keyword to a word database and collecting at least one related keyword from the word database;
a third operation of generation, by a search formula generating unit, at least one search formula that is related to the event related keyword and related keyword;
a fourth operation of transmitting, by an event related image collecting unit, the search formula to an image database and collecting at least one event related image that is related to the search formula from the image database; and
a fifth operation of training, by a training unit, a learning system by communicating with the learning system with a use of the event related image as training data;
a sixth operation of collecting, by a camera image collecting unit, at least one camera image obtained via a camera;
a seventh operation of receiving, by a determination criteria information receiving unit, at least one criterion for determination regarding the training data from the learning system by communicating with the trained learning system;
a eighteenth operation of selecting, by an unsuitable image selecting unit, when the camera image is determined based on the at least one criterion for determination, at least one unsuitable image that is determined as an event nonoccurrence image from the camera image;
a ninth operation of transmitting, by an unsuitable related image collecting unit, the unsuitable image to the image database and collecting at least one unsuitable related image that is related to the unsuitable image from the image database; and a tenth operation of retraining, by a second retraining unit, a learning system by communicating with the learning system with a use of the unsuitable related image as retraining data.

12. The method of claim 11, further comprising:

an eleventh operation of collecting, by a reliability measurement image collecting unit, at least one reliability measurement image inputted by a user;

a twelfth operation of measuring, by a reliability measuring unit, a reliability value of the retrained learning system based on the reliability measurement image; a thirteenth operation of collecting, by a reliability result collecting unit, a reliability measurement image from the learning system if the reliability value is less than a threshold value;

a fourteenth operation of transmitting, by a reliability measurement related image collecting unit, the reliability measurement image to the image database and collecting at least one reliability measurement related image that is related to the reliability measurement image from the image database; and a fifteenth operation of retraining, by a third retraining unit, a learning system by communicating with the learning system with a use of the reliability measurement related image as retraining data.

13. The method of claim 12, wherein the sixth to tenth operations and the eleventh to fifteenth operations are repeated at least twice.

* * * * *